United States Patent [19]
Krisher

[11] Patent Number: 5,647,814
[45] Date of Patent: Jul. 15, 1997

[54] FOUR PINION MATE DIFFERENTIAL GEAR ASSEMBLY HAVING A ONE-PIECE DIFFERENTIAL CASE

[75] Inventor: James A. Krisher, Fort Wayne, Ind.

[73] Assignee: Dana Corporation, Toledo, Ohio

[21] Appl. No.: 477,378

[22] Filed: Jun. 7, 1995

[51] Int. Cl.$^6$ ................................................. F16H 48/28
[52] U.S. Cl. ............................................ 475/230; 74/607
[58] Field of Search .............................. 74/607; 475/230

[56] References Cited

U.S. PATENT DOCUMENTS

| | | | |
|---|---|---|---|
| 1,461,102 | 7/1923 | Sternbergh | 475/230 |
| 3,593,595 | 7/1971 | Taylor | 475/230 |
| 3,651,713 | 3/1972 | Mueller | 475/230 |
| 3,653,280 | 4/1972 | Koskela | 475/230 |
| 3,874,251 | 4/1975 | Lapitsky et al. | 475/230 |
| 3,894,447 | 7/1975 | Michael | 475/230 |
| 3,974,717 | 8/1976 | Breed et al. | 475/230 |
| 4,856,372 | 8/1989 | Williamson | 475/230 |
| 4,959,043 | 9/1990 | Klotz et al. | 475/230 |

Primary Examiner—Charles A. Marmor
Assistant Examiner—Sherry Lynn Estremsky
Attorney, Agent, or Firm—Oldham & Oldham Co., LPA

[57] ABSTRACT

The present invention relates to a one piece, four pinion mate differential gear assembly. The first pair of pinions are rotationally supported on a cross pin that contains a cross bore formed through the central area. A pair of hollow pinion support sleeves are located on opposite sides of the cross bore, seated on the cross pin. The second pair of pinion mates are rotationally supported on the hollow sleeves while retainer plates are also engaged with the outer end of each sleeve to retain each pinion thereon. A cross bolt is inserted through the sleeves, the cross bore, and the retainer plates to retain all of the components in position. The retainer plates seat on the differential case to provide additional support to the gear assembly and to receive torque from the differential case so that stress is not concentrated at the intersection of the cross pin and cross bolt.

19 Claims, 2 Drawing Sheets

FOUR PINION MATE DIFFERENTIAL GEAR ASSEMBLY HAVING A ONE-PIECE DIFFERENTIAL CASE

FIELD OF INVENTION

The present invention relates generally to a motor vehicle differential gear assembly and more particularly to a vehicle differential gear assembly having a one-piece differential case into which four pinion mates may be easily inserted and secured to provide a differential gear assembly with superior strength. The differential gear assembly also allows access to the inner ends of the axle shafts during assembly.

BACKGROUND OF THE INVENTION

Motor vehicle differential gear assemblies are generally known and are used to transmit torque from an input shaft to a pair of output axle shafts extending generally transverse relative to the input shaft while at the same time, allowing for differential rotation of the output shafts as necessarily occurs during turning of the vehicle. In general, the differential gear assembly includes a differential case rotatably supported within an axle housing and a ring gear coupled to rotate therewith that is driven by a pinion gear coupled to the input shaft. Therefore, the differential case rotates within the axle housing in response to rotation of the torque input shaft.

The inner ends of the output shafts extend into the differential case and include side gears splined or otherwise coupled to rotate therewith while at least one pair of pinion mates is provided between and in meshing engagement with both side gears. Each pair of pinion mates are supported for rotation on a cross-pin that is secured to the differential case such that upon rotation of the case, the pinion mates transfer torque to the side gears. While in many instances, one pair of pinion mates is adequate to transmit the torque from the differential case to the side gears, in heavy duty or high performance applications, an additional pair of pinion mates may be provided to form a four pinion mate differential having increased strength relative to the two pinion mate differential having only one pair of pinion mates.

The increased complexity associated with a four pinion mate differential increases the cost of the differential and the assembly time. Because of the increased number of inter-related components, extra care must be taken to ensure that all components are within manufacturing tolerances so that the components will fit together as required during assembly. The increased complexity associated with a four pinion mate differential typically requires the use of a two piece differential case that is generally more expensive to manufacture and assemble and not as strong as a one piece differential case.

One piece differentials having four pinion mates have been developed but have not proven satisfactorily strong nor have they allowed for the easy assembly of both the pinion mates and also the related components such as the axle shaft retainer clips that secure the axle shafts and side gears in position. For example, prior systems may add a second cross pin that is connected to only the primary cross pin. In such a system, it is likely that damage to the differential will result at the connection between the primary and secondary cross pins.

SUMMARY OF THE INVENTION

The present invention is therefore directed to a four pinion mate differential gear assembly for transmitting torque from an input shaft to a pair of side gears respectively coupled to rotate with a pair of output shafts about an output axis. The differential gear assembly comprises a differential case having a gear chamber, and a cross pin having a medial cross bore formed therethrough. The cross pin has first and second ends connected to the differential case such that the cross pin extends through the gear chamber of the case. First and second pinion mates are rotatably supported in a diametrically opposed relationship on the cross pin within the gear chamber such that each is in meshing engagement with the side gears. Further, first and second hollow pinion support sleeves are seated on opposite sides of the cross pin in alignment with the medial cross bore, wherein the first and second pinion support sleeves respectively rotationally support third and fourth pinion mates in a diametrically opposed relationship such that the third and fourth pinion mates are in meshing engagement with the side gears. First and second retainer plates, each including an aperture formed therein and each respectively engaged with the pinion support sleeves, retain the third and fourth pinion mates on the sleeves. A cross bolt extends through the medial cross bore, the first and second pinion support sleeves, and the apertures formed in the retainer plates to secure the third and fourth pinion mates in meshing engagement with the side gears.

The present invention provides the advantages associated with a four pinion mate differential gear assembly, such as increased strength, while at the same time providing the advantages associated with a one piece differential case such as ease of manufacture and assembly.

DETAILED DESCRIPTION OF THE INVENTION

Reference will now be made in detail to the present preferred embodiment of the invention, an example of which is illustrated in the accompanying drawings. Wherever possible, the same reference numbers will be used throughout the drawings to refer to the same or like parts.

Figure 2:
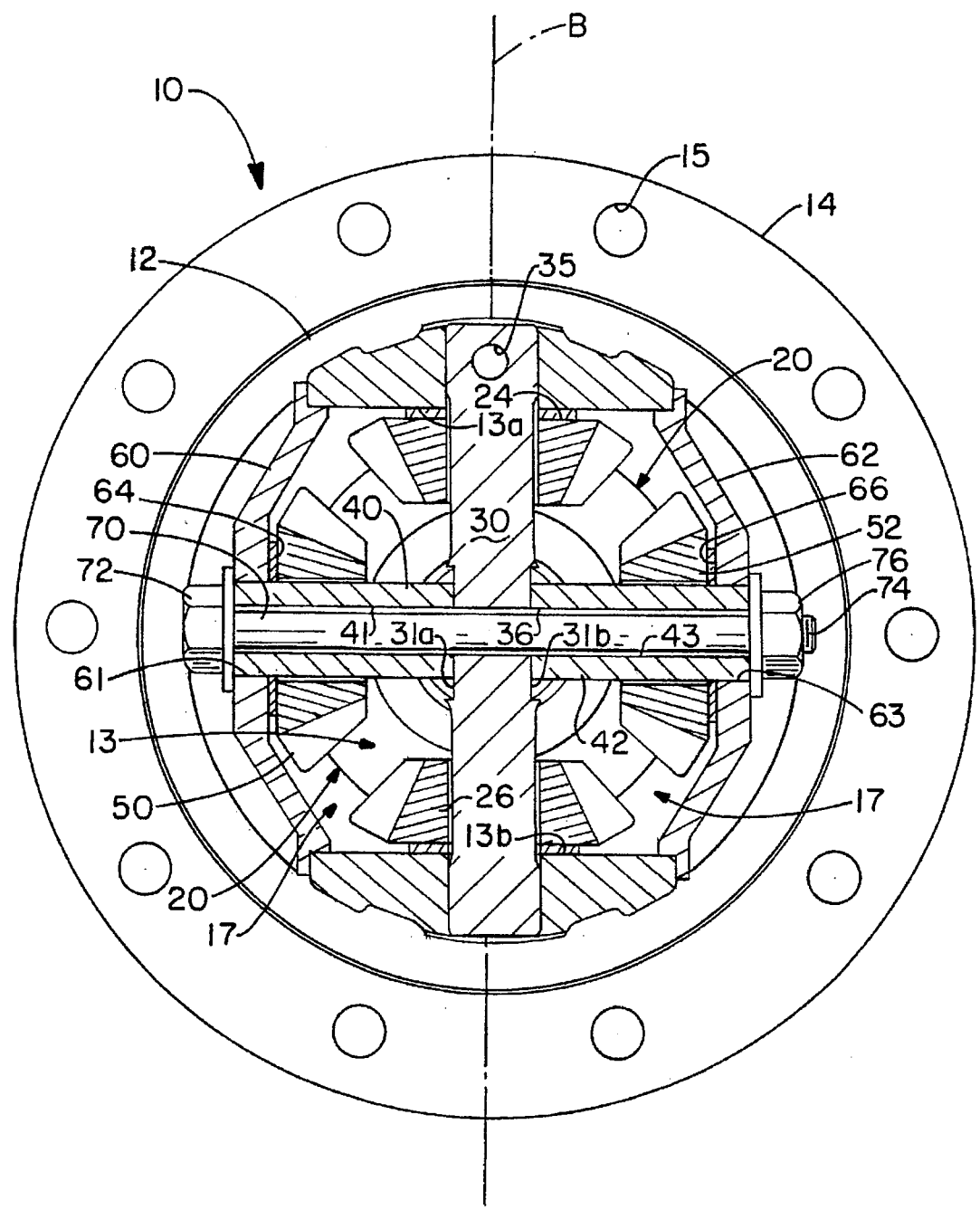
FIG. 2 is a sectional view taken along line 2—2 of FIG. 1, the third and fourth pinion mates and associated components having been added.

The differential gear assembly of the present invention is shown generally at 10 and comprises a unitary differential housing or case 12 which is typically supported for rotation about an output axis A within an axle housing (not shown) by roller bearings (not shown). The differential case 12 includes a circumferentially extending flange 14 having a plurality of apertures 15 formed therein. The apertures 15 are provided to secure a ring gear (not shown) to the flange 14 such that the ring gear meshes with an input shaft/pinion assembly (not shown) to receive torque therefrom causing case 12 to rotate about output axis A. Differential case 12 defines a hollow area or gear chamber 13 including two access openings or windows 17 (FIG. 2) formed therein on opposite sides of case 12 providing access to gear chamber 13 as is needed during assembly and disassembly of the various components. Gear chamber 13 preferably has substantially straight inner thrust surfaces 13a, 13b, 13c, 13d connected by rounded corners such that gear chamber 13 is generally rectangular in cross-sectional shape as shown. Gear chamber 13 may therefore be formed by performing a single broach pass through windows 17 of case 12. In this manner, the dimensions of the gear chamber 13 may be accurately formed and a cost reduction due to simplification of machining operations may be obtained.

A pair of side gears 20, 22 are rotationally supported within case 12 for rotation about axis A. A first pair of pinion gears or pinion mates comprising first and second pinion mates 24, 26 are rotationally mounted in a diametrically opposed relationship in meshing engagement with side gears 20, 22 on a cross pin 30 having a longitudinal axis B which is generally perpendicular to and intersects axis A. Pinion mates 24, 26 are properly mounted on cross pin 30 using suitable thrust washers as is known in the art. Use of a single broach pass through windows 17 of case 12 provides finished thrust surfaces 13a, 13b for pinions 24, 26, and thrust surfaces 13c, 13d for side gears 20, 22, respectively. The cross pin 30 has ends 32, 34 respectively received within apertures 16, 18 formed through opposite sides of case 12 and is retained in this position by any suitable retaining means such as retaining pin 35 pressed into aligned apertures formed in end 32 of cross pin 30 and in case 12. Side gears 20, 22 are respectively provided with interiorly splined bores 21, 23 which receive splined inner ends of axle shafts 25a, 25b extending into bores 21, 23 through openings 19a, 19b formed in case 12. Axle shafts 25a, 25b are typically respectively retained in position within bores 21, 23 of side gears 20, 22 by c-clip retainers or other suitable retainers as are known in the art.

Figure 1:
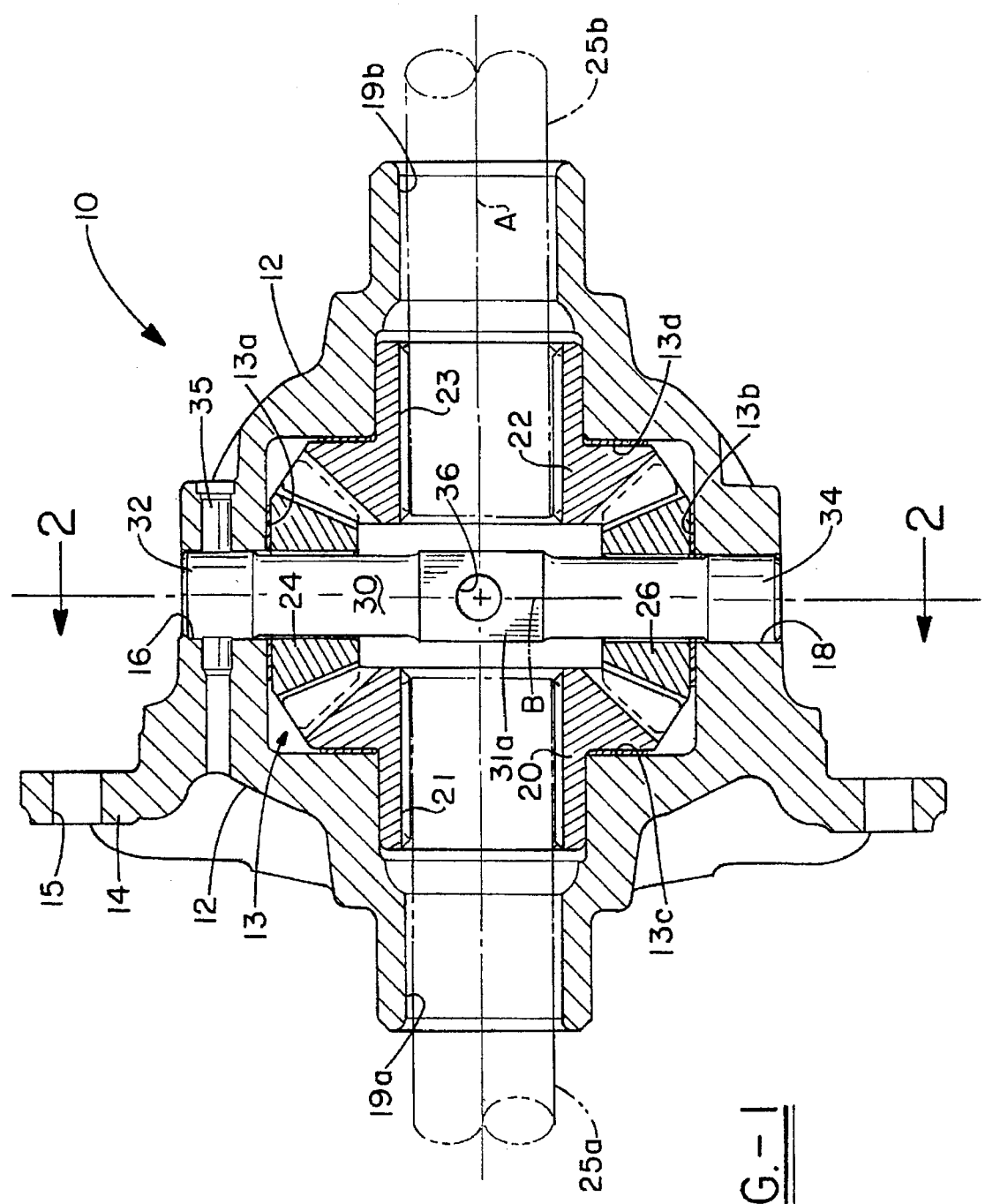
FIG. 1 is a cross-sectional view of the differential gear assembly of the present invention with the third and fourth pinion mates and associated components not shown for reasons of clarity.

Cross pin 30 includes a medial cross bore 36 formed therein. Medial cross bore 36 is formed through the medial or central portion of cross pin 30, generally at the intersection of axis A and axis B, perpendicular to both of these axes. As may be seen in FIG. 2, first and second hollow pinion support sleeves 40, 42, respectively including longitudinally extending central bores 41, 43, are designed to seat upon cross pin 30 which may include opposing flat surfaces 31a, 31b to provide a suitable seating surface for sleeves 40, 42. A second pair of pinion gears or pinion mates comprising third and fourth pinion mates 50, 52 are respectively rotationally mounted in a diametrically opposed relationship on sleeves 40, 42 and both the third and fourth pinions 50, 52 are provided in meshing engagement with side gears 20, 22. Pinions 50, 52 are properly mounted on sleeves 40, 42 using suitable thrust washers as is known in the art. Third and fourth pinion mates 50, 52, sleeves 40, 42, and other related components as discussed herein are not shown in FIG. 1 for reasons of clarity. As may be further seen in FIG. 2, a first retainer plate 60 including an aperture 61 formed therein is engaged with hollow pinion support sleeve 40 to retain third pinion mate 50 on sleeve 40 and to provide a flat thrust surface 64 for pinion 50. In the preferred embodiment as shown, retainer plate 60 is engaged with sleeve 40 where sleeve 40 extends into aperture 61. Likewise, a second retainer plate 62 including an aperture 63 is engaged with hollow pinion support sleeve 42 to retain fourth pinion mate 52 on sleeve 42 and to provide a flat thrust surface 66 for pinion 52. In the preferred embodiment as shown, retainer plate 62 is engaged with sleeve 42 where sleeve 42 extends into aperture 63. Alternatively, retainer plates 60, 62 may be respectively positioned adjacent sleeves 40, 42 such that sleeves 40, 42 do not extend into apertures 61, 63. A cross bolt 70 including an enlarged head 72 at one end and threads 74 at an opposite end is inserted through sleeves 40, 42, cross bore 36, and apertures 61, 63 in retainer plates 60, 62 and is secured therein by a nut 76 coacting with threads 74. Cross bolt 70 acts to secure sleeves 40, 42, pinion mates 50, 52, and retainer plates 60, 62 in position such that pinion mates 50, 52 are maintained in a diametrically opposed relationship on sleeves 40, 42 and in meshing engagement with side gears 20, 22. Cross bolt 70 also maintains retainer plates 60, 62 in position such that plates 60, 62 are seated on differential case 12 to provide additional strength to the differential gear assembly and specifically to the cross bolt 70. Retainer plates 60, 62 receive torque from differential case 12 and transmit the torque to the pinion mates 50, 52 such that stress is not concentrated on the intersection of cross bolt 70 and cross pin 30. Although retainer plates 60, 62 cover a substantial portion of access windows 17, it is thought preferable to size retainer plates such that oil flow through the access windows 17 will not be unduly restricted. Also, although cross bolt 70 has been shown as having an enlarged head 72 at one end and threads 74 at the other end, those skilled in the art will recognize that cross bolt 70 may be provided in a variety of configurations. For example, cross bolt 70 may take the form of a substantially uniform diameter rod or pin secured in position by c-clips or other retainers located at opposite ends of the pin. Use of single broach pass through windows 17 of case 12 to form flat thrust surfaces 13a–d, in conjunction with flat thrust surfaces 64, 66 provided upon retainer plates 60, 62, respectively, permits all four pinion mates 24, 26, 50, 52 to have a common design and common thrust washers to simplify construction. As an alternative to being flat, any of the thrust surfaces 13a–d, 64, 66 may be spherical surfaces or otherwise vary from the configuration shown herein.

Those skilled in the art will recognize that the present invention provides a one piece, four pinion mate differential gear assembly that has increased strength relative to prior systems and that is much simpler to manufacture. For example, prior to installation of the retainer plates 60, 62, the present invention allows for access to the c-clip retainers that retain the axle shafts 25a, 25b within bores 21, 23 of side gears 20, 22. Also, the one-piece differential case 12 avoids the deficiencies associated with prior two-piece four pinion mate differentials. For example, some of these prior differentials require extensive complex machining of the various components to ensure a proper fit within the differential case 12.

Although not shown as such, differential gear assembly may be provided as a limited slip differential. Also, while the foregoing description has set forth the preferred embodiment of the invention in particular detail, it must be understood that numerous modifications, substitutions, and changes may be undertaken without departing from the true spirit and scope of the present invention as defined by the ensuing claims.

What is claimed is:

1. A four pinion mate differential gear assembly for transmitting torque from an input shaft to a pair of side gears respectively coupled to rotate with a pair of output shafts about an output axis, said differential gear assembly comprising:

a differential case having a gear chamber formed therein, said differential case supported for rotation about said output axis;

a cross pin having a medial cross bore formed therethrough, said cross pin having first and second ends connected to said differential case such that said cross pin extends through said gear chamber and intersects said output axis;

first and second pinion mates respectively rotatably supported in a diametrically opposed relationship on said first and second ends of said cross pin within said gear chamber, each of said first and second pinion mates provided in meshing engagement with said pair of side gears;

first and second hollow pinion support sleeves seated on opposite sides of said cross pin in alignment with said medial cross bore, said first and second pinion support sleeves respectively rotatably supporting third and fourth pinion mates in diametrically opposed relationship such that said third and fourth pinion mates are in meshing engagement with said pair of side gears;

first and second retainer plates, each having an aperture formed therein and respectively engaged with said first and second pinion support sleeves to retain said third and fourth pinion mates on said sleeves, said first and second retainer plates being substantially frusto-conical in configuration and extending outwardly beyond said third and fourth pinion mates, respectively; and a cross bolt extending through said medial cross bore, said first and second hollow pinion support sleeves, and said apertures formed in said first and second retainer plates to secure said third and fourth pinion mates in meshing engagement with said pair of side gears.

2. The differential gear assembly as recited in claim 1, wherein said differential case is a one piece construction.

3. The differential gear assembly as recited in claim 2, wherein said first and second retainer plates include an outwardly extending edge which bears against said differential case.

4. The differential gear assembly as recited in claim 2, wherein said first and second retainer plates are engaged with said differential case to respectively support said first and second pinion support sleeves and to receive torque from said differential case.

5. The differential gear assembly as recited in claim 4, wherein said cross bolt includes an enlarged head at a first end and external threads on a second end and wherein said differential gear assembly further includes a nut threaded onto said second end of said cross bolt to retain said third and fourth pinion mates in meshing engagement with said pair of side gears.

6. The differential gear assembly as recited in claim 5, wherein said differential case includes first and second access windows formed therein, and said first and second retainer plates are positioned across said first and second access windows.

7. The differential gear assembly as recited in claim 6, wherein said gear chamber includes flat thrust surfaces for said first and second pinion mates and said side gears.

8. The differential gear assembly as recited in claim 7, wherein said first and second retainer plates include an outwardly extending edge which bears against said differential case.

9. The differential gear assembly as recited in claim 8, wherein said outwardly extending edge of said first and second retainer plates include a step to limit radial movement of said first and second retainer plates in relation to said differential case.

10. The differential gear assembly as recited in claim 1, wherein said first and second retainer plates are engaged with said differential case to respectively support said first and second pinion support sleeves and to receive torque from said differential case.

11. The differential gear assembly as recited in claim 1, wherein said cross pin includes opposing flat surfaces that respectively provide a seat upon said cross pin for said first and second pinion support sleeves.

12. The differential gear assembly as recited in claim 1, wherein said cross bolt includes an enlarged head at a first end and external threads on a second end and wherein said differential gear assembly further includes a nut threaded onto said second end of said cross bolt to retain said third and fourth pinion mates in meshing engagement with said pair of side gears.

13. The differential gear assembly as recited in claim 12, wherein longitudinal movement of said first retainer plate is precluded by said enlarged head of said cross bolt and longitudinal movement of said second retainer plate is precluded by said nut threaded onto said second end of said cross bolt.

14. The differential gear assembly as recited in claim 13, wherein said first and second retainer plates include an outwardly extending edge which bears against said differential case.

15. The differential gear assembly as recited in claim 14, wherein said outwardly extending edge of said first and second retainer plates include a step to limit radial movement of said first and second retainer plates in relation to said differential case.

16. The differential gear assembly as recited in claim 1, wherein said differential case includes first and second access windows formed therein, and said first and second retainer plates are positioned across said first and second access windows.

17. The differential gear assembly as recited in claim 1, wherein said gear chamber includes flat thrust surfaces for said first and second pinion mates and said side gears.

18. The differential gear assembly as recited in claim 1, wherein said first and second retainer plates include an outwardly extending edge which bears against said differential case.

19. The differential gear assembly as recited in claim 18, wherein said outwardly extending edge of said first and second retainer plates include a step to limit radial movement of said first and second retainer plates in relation to said differential case.

* * * * *